United States Patent
Schlienger

[15] 3,651,239
[45] Mar. 21, 1972

[54] POINT COOLED ROTATING WHEEL ELECTRODE

[72] Inventor: Max P. Schlienger, 136 Mitchell Boulevard, San Rafael, Calif. 94903

[22] Filed: Feb. 18, 1971
[21] Appl. No.: 116,430

[52] U.S. Cl. ............................................................ 13/18
[51] Int. Cl. ....................................................... H05b 7/08
[58] Field of Search .......................................... 13/9, 18

[56] References Cited

UNITED STATES PATENTS

| | | | |
|---|---|---|---|
| 2,883,721 | 4/1959 | Gorga et al. | 13/9 X |
| 3,420,939 | 1/1969 | Schlienger | 13/18 |
| 3,461,214 | 8/1969 | Schlienger | 13/18 |

*Primary Examiner*—Bernard A. Gilheany
*Assistant Examiner*—Roy N. Envall, Jr.
*Attorney*—Townsend & Townsend

[57] ABSTRACT

An improved coolant distribution system for a rotating nonconsumable electrode wheel in an arc melting furnace. A rotating tubular drive shaft suspends the electrode wheel above the melt surface in an obliquely inclined orientation whereby successive portions of the wheel periphery are brought into arc-forming proximity to the melt surface as the wheel is rotated. A non rotating nozzle is positioned within the electrode wheel with its discharge orifice in heat dissipating proximity to the interior surface of the wheel at the portion of the wheel periphery in arc-forming proximity to the melt at any given instant.

11 Claims, 2 Drawing Figures

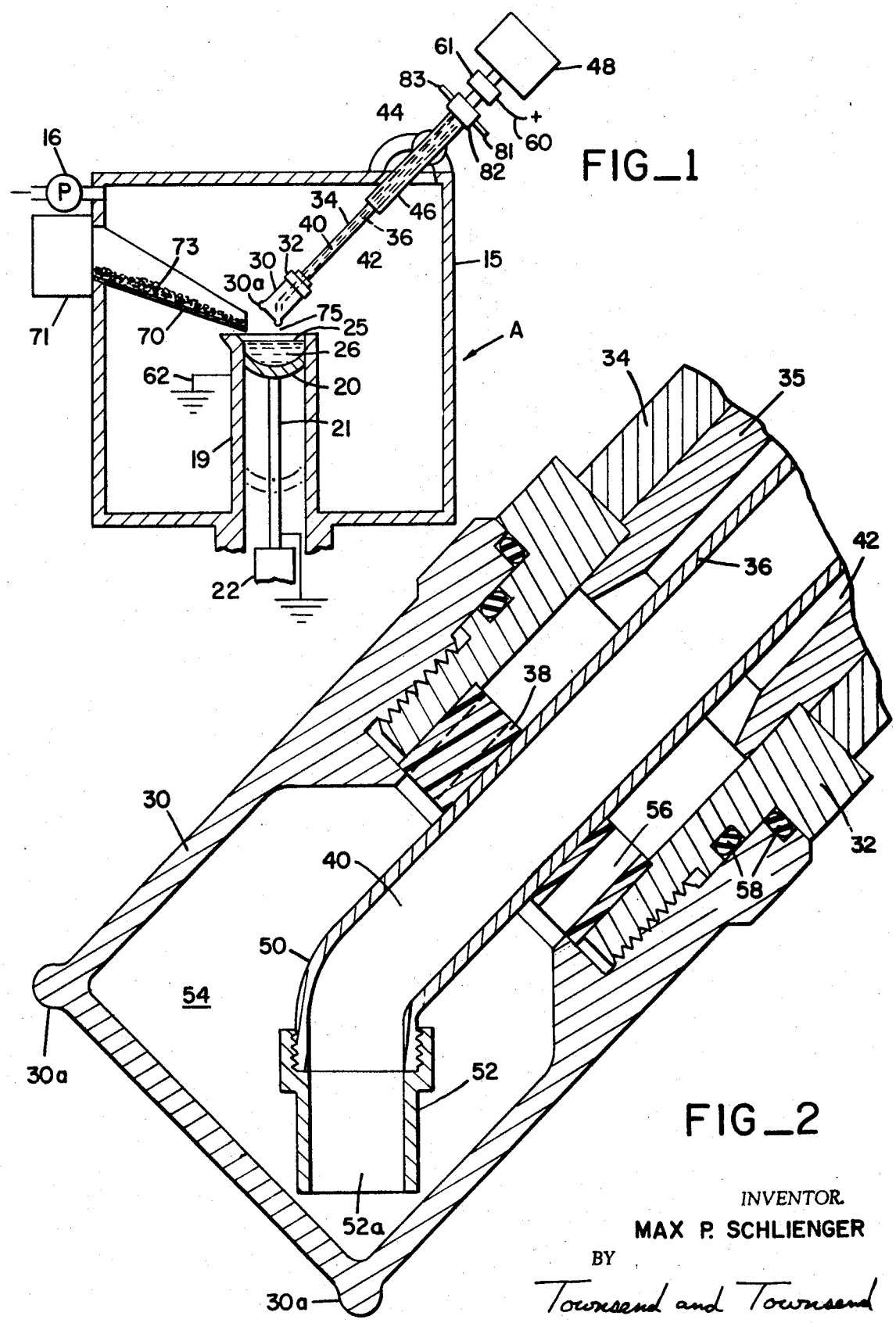

POINT COOLED ROTATING WHEEL ELECTRODE

This invention relates to an improved coolant distribution system for a rotating electrode in an arc melting furnace.

Arc furnaces generally incorporate a melt and an electrode which is arranged to establish an arc to the melt in order to create a sufficient temperature gradient to melt materials within an evacuated or controlled atmosphere chamber. In applications where scrap, powder or sponge material is to be melted a non-consumable electrode is employed to create the requisite arc. Such non-consumable electrodes when appropriately cooled can function to provide the arc which maintains the melt at a sufficient temperature gradient to melt the powder or granular materials being added to the melt. However, the heat at the electrode tip causes severe erosion of the tip which in the case of higher temperature applications renders such a technique extremely difficult. This is particularly true where refractory and reactive metals such as columbium, molybdenum, tungsten, zirconium and titanium are to be treated.

According to applicant's prior inventions disclosed in U.S. Pat. No. 3,420,939 issued Jan. 7, 1969, and U.S. Pat. No. 3,461,214 issued Aug. 12, 1969, these problems are overcome by providing a novel wheel-shaped electrode mounted for rotation in proximity to the melt. In one embodiment described in these patents the electrode wheel is disposed at an oblique angle to the surface of the melt such that the arc is formed from that portion of the wheel periphery which is closest to the surface of the melt at any particular time. As the wheel rotates the arc originates from changing portions of the electrode periphery. In these patents cooling is applied generally over the interior surface of the wheel to maintain the electrode at a sufficiently low temperature to allow high temperature arc melting to occur without electrode destruction.

Applicant has found that more effective operation of the electrode system can be achieved by directing the flow of incoming coolant fluid specifically at the point of maximum heat generation, namely that portion of the wheel periphery which is then in arc-forming proximity to the surface of the melt.

Accordingly it is the primary object of the present invention to provide an arc furnace having a rotating electrode wheel with an improved coolant distribution system.

Other objects, features and advantages of the present invention will be more readily apparent from the following detailed description with reference to the accompanying drawings, wherein:

FIG. 1 is a diagrammatic view showing an arc furnace incorporating a principal embodiment of the present invention; and FIG. 2 is a cross-sectional view of the electrode wheel showing the novel coolant distribution system of the present invention.

Referring now to the drawings in reference to FIGS. 1 and 2 there is provided an arc furnace A formed with an enclosure or housing 15 and having an evacuation pump mechanism 16 adapted to withdraw gas from the housing. By this means the interior of housing 15 can be maintained under high vacuum conditions the exact pressure of which is determined by the materials to be worked on and the proposed purpose for their treatment. Alternatively the melt can be accomplished under pressure of suitable inert gases or mixtures. This is sometimes required to prevent evaporation of the materials or alloy while being melted.

A cylinder 19 is vertically mounted in the interior of housing 15 in which a crucible 20 is mounted for reciprocal movement within the cylinder. The crucible is supported by a shaft 21 and is drawn downwardly by a propulsion device 22 on demand. Thus the upper surface 25 of the melt 26 within crucible 20 can be maintained at a desired level simply by raising and lowering crucible 20 by the power device 22. As additional materials are fed to melt 26 the crucible 20 is accordingly lowered thereby holding the upper surface 25 of melt 26 in its requisite position. The aforesaid melt-forming structure is common in the art and is employed in the present form for illustrative purposes only, it being understood that the invention can be combined with other forms of work supporting devices.

The electrode wheel of the present invention is mounted above melt 26 and primarily includes an electrode wheel 30 made of an electrically conductive material and having a hollow interior and protuberant periphery 30a. The electrode wheel 30 is removably mounted on electrically conductive collar 32. Collar 32 is in turn fixedly attached to tubular drive shaft 34. Mounted on the interior surface of drive shaft 34 and contiguous to collar 32 is liner 35 which is made of an electrically conductive material. The liner 35, collar 32 and electrode wheel 30 are thus in electrical communication with each other. Conduit 36 is centrally disposed within drive shaft 34 by fluid bearing 38 which allows rotation of drive shaft 34, liner 35, collar 32 and electrode wheel 30 about conduit 36. The interior of conduit 36 forms fluid inlet duct 40 and the annular space between conduit 36 on the one hand and collar 32 and liner 35 on the other hand, forms fluid exhaust duct 42.

Drive shaft 34 is pivotally and extendably suspended above melt 26 by means of ball joint mounting 44 and sleeve 46 which allow the drive shaft and attached electrode wheel 30 to be positioned in an angular orientation to the surface of the melt 26 such that successive portions of protuberant periphery 30a are brought into arc-forming proximity with the melt surface as the electrode wheel is rotated. In addition mounting 44 and sleeve 46 allow the arc spacing between electrode periphery 30a and melt surface 25 to be varied as desired. One suitable type of pivotal mounting is disclosed in applicant's copending U.S. Pat. application entitled "ARC FURNACE ELECTRODE WHEEL MOUNTING SYSTEM," Ser. No. 55,869 filed July 17, 1970.

Drive shaft 34 is rotatably mounted within sleeve 46 which is slidably engaged in mounting 44. Mounting 44 electrically insulates drive shaft 34 and the attached electrode assembly including liner 35, collar 32 and electrode wheel 30 from housing 15 as well as providing a fluid-tight seal between sleeve 46 and housing 15. Drive shaft 34 extends within sleeve 46 through mounting 44 to the exterior of housing 15 and is therein driven by motor 48 mounted on the external end of the shaft. Thus movement of the motor causes rotation of the shaft and attached electrode wheel 30.

The internal structure of electrode wheel 30 is shown in FIG. 2. Electrode wheel 30 is removably mounted on collar 32 as by mating threads as shown. Collar 32 is in turn affixed to the end of the drive shaft 34 so as to contact electrically conductive liner 35 mounted on the inner surface of drive shaft 34. The electrode wheel, collar, liner and drive shaft rotate about stationary conduit 36 by means of fluid bearing 38 which is attached to collar 32. Conduit 36 is provided with an elbow 50 at its lower extremity on which is mounted a fluid directing nozzle 52. Nozzle 52 includes a discharge orifice 52a which is positioned to direct the incoming flow of coolant directly against the internal surface of the electrode wheel specifically at the point on the periphery thereof which is then in arc-forming proximity to the melt. This provides maximum heat dissipation at the point of generation. The nozzle 52 may be removably attached to elbow 50 as for example by mating threads on the two elements as shown.

The interior of the electrode system is provided with a fluid exhaust manifold 54 communicating with orifice 52a. This fluid exhaust manifold collects the coolant discharging from nozzle 52 and impinging on the interior surface of the electrode wheel and directs it through a plurality of apertures 56 in fluid bearing 38. These apertures communicate with annular fluid exhaust duct 42. O-rings 58 provide a fluid-tight seal between electrode wheel 30 and collar 32 to prevent coolant leakage at that juncture.

The operation of the cooling system is as follows. Coolant such as water is transmitted from inlet pipe 81 through fluid manifold 82 and thence into fluid inlet duct 40. The coolant is carried along inlet duct 40 until it discharges through nozzle 52 at orifice 52a in heat dissipating proximity to the arc-forming portion of the wheel electrode interior surface. The coolant is then collected by fluid exhaust manifold 54 and directed through apertures 56 into fluid exhaust duct 42 and thence to fluid manifold 82 and out exhaust pipe 83.

A source of high energy electrical power is provided at electrical terminal 60 that is connected by a coupling 61 to liner 35 for transfer of electrical energy directly to the conductive body of electrode wheel 30 through collar 32. The opposite pole of the aforesaid electrical energy is connected by ground 62 to cylinder 19 thereby establishing a grounded polarity at melt 26. This obviously produces a high energy potential difference between the electrode wheel 30 and crucible 20. The polarity of electrode wheel 30 and melt 26 can also be reversed with current flow from the melt to the electrode.

Materials to be melted can be fed into melt 26 by conventional means, one illustration of such is shown in FIG. 1 in which a chute 70 is fed materials through an airlock mechanism 71. The termination of the chute is arranged to drop work material shown at 73 into crucible 20.

In operation work material 73 is fed into crucible 20 through the airlock valve 71. Pump 16 is actuated to maintain the interior of housing 15 at an appropriate vacuum. Motor 48 is energized to rotate electrode wheel 30 at an appropriate speed. Electrical energy is applied to terminal 60 and at ground 62, at sufficient intensity to cause an arc 75 to be developed from the protuberant periphery 30a at electrode wheel 30 to the upper surface 25 of melt 26. The arc raises the thermal gradient sufficiently to cause the particle 73 to form the molten bath or melt 26. Rotation of the electrode wheel 30 continually changes the location on the protuberant periphery 30a from which arc 75 emanates. However, stationary nozzle 52 directs the incoming coolant flow at all times to the location of maximum heat generation. The contour shape of electrode wheel 30 and the spacing between the top surface 25 of melt 26 are determined by a conventional arc furnace teachings. As the heating of melt 26 continues and the material is purified by the early evaporation of impurities and their subsequent exhaust from housing 15 the crucible 20 is thence lowered and additional material 73 is fed to the melt 26. Crucible 20 is lowered in a manner to maintain the upper surface 25 in appropriately spaced arc-forming relationship to the bottom of electrode wheel 30, thus insuring a constant arc-forming spacing between the electrode members. In addition, the arc-forming spacing can be controlled by extending or retracting sleeve 46 within mounting 44.

While the subject invention is known in combination in a furnace application for purifying and molding granular materials, it is to be understood that the electrode wheel 30 can be used for other types of furnace applications which are known in the art.

Although one embodiment of this invention has been shown and described it will be apparent that other adaptations and modifications can be made without departing from the true spirit and scope of the invention.

What is claimed is:

1. A coolant distribution system for a rotating non-consumable electrode wheel disposed within a controlled atmosphere enclosure in arc-forming proximity to the surface of a crucible suitable for containing conductive meltable materials comprising:
   coolant discharge means for directing said coolant against the interior surface of said electrode wheel specifically at the point of arc-formation, said discharge means being positioned in heat dissipating proximity to said interior surface;
   coolant supply means in fluid transmitting communication with said coolant discharge means; and
   coolant exhaust means in fluid transmitting communication with said electrode wheel interior surface.

2. Apparatus according to claim 1 wherein said coolant discharge means comprises a stationary nozzle terminating at one end in a discharge orifice located in heat dissipating proximity to said interior electrode surface and being in fluid transmitting communication with said coolant supply means at the other end thereof.

3. Apparatus according to claim 2 wherein said coolant supply means includes a tubular drive shaft rotatably supporting said electrode wheel above said crucible surface and a fluid intake conduit centrally disposed within said drive shaft in fluid transmitting communication with said nozzle said conduit being concentrically positioned within said drive shaft to form an annular fluid exhaust duct therebetween which communicates with the interior of said electrode wheel.

4. Apparatus according to claim 3 wherein said drive shaft rotatably supports said electrode wheel above said crucible surface in an obliquely inclined orientation whereby successive portions of the electrode wheel periphery are brought into arc-forming proximity to said surface as said wheel is rotated.

5. A coolant distribution system for a rotating non-consumable electrode wheel positioned within a controlled atmosphere enclosure in arc-forming proximity to the surface of a crucible suitable for containing conductive meltable materials comprising:
   a. a tubular drive shaft rotatably suspending said electrode wheel above said crucible surface in an obliquely inclined orientation whereby successive portions of the periphery of said electrode wheel are brought into arc-forming proximity to said crucible surface as said electrode wheel is rotated;
   b. a stationary nozzle positioned within the interior of said rotating electrode wheel having a discharge orifice in heat dissipating proximity to the interior surface of said electrode wheel at the portion of said periphery which is in arc-forming proximity to said crucible surface at any given instant;
   c. coolant supply means communicating with said nozzle; and
   d. coolant exhaust means communicating with the interior of said electrode wheel.

6. Apparatus according to claim 5 further comprising a tubular inlet conduit disposed within said drive shaft one end of said conduit being in fluid transmitting communication with said nozzle and the other end of said conduit in fluid transmitting communication with said coolant supply means. Said conduit being concentrically positioned within said drive shaft to form an annular exhaust duct therebetween one end of which is in fluid communication with said electrode wheel interior and the other end of which is in fluid transmitting communication with said coolant exhaust means.

7. In a melting and casting arc furnace of the type having an enclosed housing providing a controlled ambient atmosphere, a crucible mounted within said housing in which conductive meltable material is to be melted and a rotating non-consumable electrode wheel having a hollow interior and a protuberant periphery, said wheel being disposed at the end of a shaft mounted within said housing such that said electrode wheel is obliquely inclined to the surface of said meltable materials within said crucible with successive portions of the wheel periphery being in arc-forming proximity to said surface as said wheel is rotated, the improvement comprising a coolant fluid distribution system including coolant discharge means disposed in heat dissipating proximity to the interior surface of said electrode wheel for directing coolant specifically at the point of arc-formation, coolant supply means in fluid transmitting communication with said coolant discharge means and coolant exhaust means in fluid transmitting communication with the interior of said electrode wheel.

8. Apparatus according to claim 7 wherein said coolant discharge means comprises a stationary nozzle terminating at one end in a discharge orifice in heat dissipating proximity to said interior electrode surface and being in fluid transmitting communication with said coolant supply means at the other end thereof.

9. Apparatus according to claim 8 further comprising a tubular drive shaft rotatably supporting said electrode wheel above said crucible surface and a fluid intake conduit centrally disposed within said drive shaft in fluid transmitting communication with said nozzle said conduit concentrically positioned within said drive shaft to form an annular fluid exhaust duct therebetween in fluid transmitting communication with the interior of said electrode wheel.

10. In a melting and casting arc furnace of the type having an enclosed housing providing a controlled ambient atmosphere, a crucible mounted within said housing in which conductive meltable material is to be melted and a rotating non-consumable electrode wheel having a hollow interior and a protuberant periphery, said wheel being disposed at the end of a shaft mounted within said housing such that said electrode wheel is inclined to said crucible surface at an oblique angle with successive portions of the wheel periphery being in arc-forming proximity to said surface as said wheel is rotated, the improvement comprising: coolant fluid distribution means including a non-rotating nozzle positioned within the interior of said electrode wheel, said nozzle having a discharge orifice in heat dissipating proximity to the interior surface of said electrode wheel at the portion thereof which is in arc-forming proximity to said crucible surface as said wheel is rotated, coolant supply means communicating with said nozzle and coolant exhaust means communicating with the interior of said electrode wheel.

11. Apparatus according to claim 10 further comprising a tubular fluid intake conduit disposed within said drive shaft one end of said conduit in fluid transmitting communication with said nozzle and the other end of said conduit in fluid transmitting communication with said coolant supply means, said conduit being concentrically positioned within said drive shaft such that the space between said conduit and said drive shaft defines an annular fluid exhaust duct one end of which is in fluid transmitting communication with the interior of said electrode wheel and the other end of which is in fluid transmitting communication with said coolant exhaust means.

* * * * *